United States Patent [19]

Rives

[11] Patent Number: 4,825,964
[45] Date of Patent: May 2, 1989

[54] ARRANGEMENT FOR REDUCING SEAL DAMAGE BETWEEN ROTATABLE AND STATIONARY MEMBERS

[76] Inventor: Allen K. Rives, 12211 Carols Way Cir., Houston, Tex. 77070

[21] Appl. No.: 111,794

[22] PCT Filed: Apr. 14, 1987

[86] PCT No.: PCT/US87/00839
§ 371 Date: Aug. 24, 1987
§ 102(e) Date: Aug. 24, 1987

[51] Int. Cl.[4] .................. E21B 10/22; F16C 19/00
[52] U.S. Cl. .................. 175/371; 175/359; 384/94; 384/95; 384/470; 384/572
[58] Field of Search ............. 175/371, 372, 227, 228, 175/356, 357, 358, 359; 277/35; 384/92, 93, 94, 95, 130, 470, 477, 523, 550, 572

[56] References Cited

U.S. PATENT DOCUMENTS

| | | | |
|---|---|---|---|
| 1,905,066 | 4/1933 | Scott | 175/368 |
| 3,244,459 | 4/1966 | Ortloff | 175/372 |
| 3,251,634 | 5/1966 | Dareing | 175/228 |
| 3,601,456 | 8/1971 | Becker | 384/92 |
| 3,918,778 | 11/1975 | Jacobson | 384/523 |
| 3,995,367 | 12/1976 | Penny | 384/94 |
| 4,098,358 | 7/1978 | Klima | 175/65 |
| 4,172,502 | 10/1979 | Van Nederveen | 175/369 |
| 4,258,806 | 3/1981 | Kunkel et al. | 175/370 |
| 4,290,497 | 9/1981 | Barnetche | 175/371 |
| 4,446,933 | 5/1984 | Bodine | 175/228 |
| 4,533,003 | 8/1985 | Bailey | 384/95 |
| 4,600,064 | 7/1986 | Scales et al. | 175/368 |
| 4,618,271 | 10/1986 | Li | 384/550 |

FOREIGN PATENT DOCUMENTS

| | | | |
|---|---|---|---|
| 2112785 | 11/1971 | Fed. Rep. of Germany | 384/550 |
| 2409585 | 9/1974 | Fed. Rep. of Germany | 384/470 |
| 200538 | 10/1967 | U.S.S.R. | |

*Primary Examiner*—Jerome W. Massie
*Assistant Examiner*—Terry Lee Melius
*Attorney, Agent, or Firm*—Jack W. Hayden

[57] ABSTRACT

A sealing relationship between a rotatable and stationary member is formed by a seal arrangement between the rotatable and stationary member wherein a first member engages the seals forming the sealing relationship and a second member is rotatable by the rotatable member to rotate the first member about the stationary member at a substantially reduced rotational speed relative to the rotational speed of the rotatable member to inhibit damage to the sealing relationship.

36 Claims, 4 Drawing Sheets

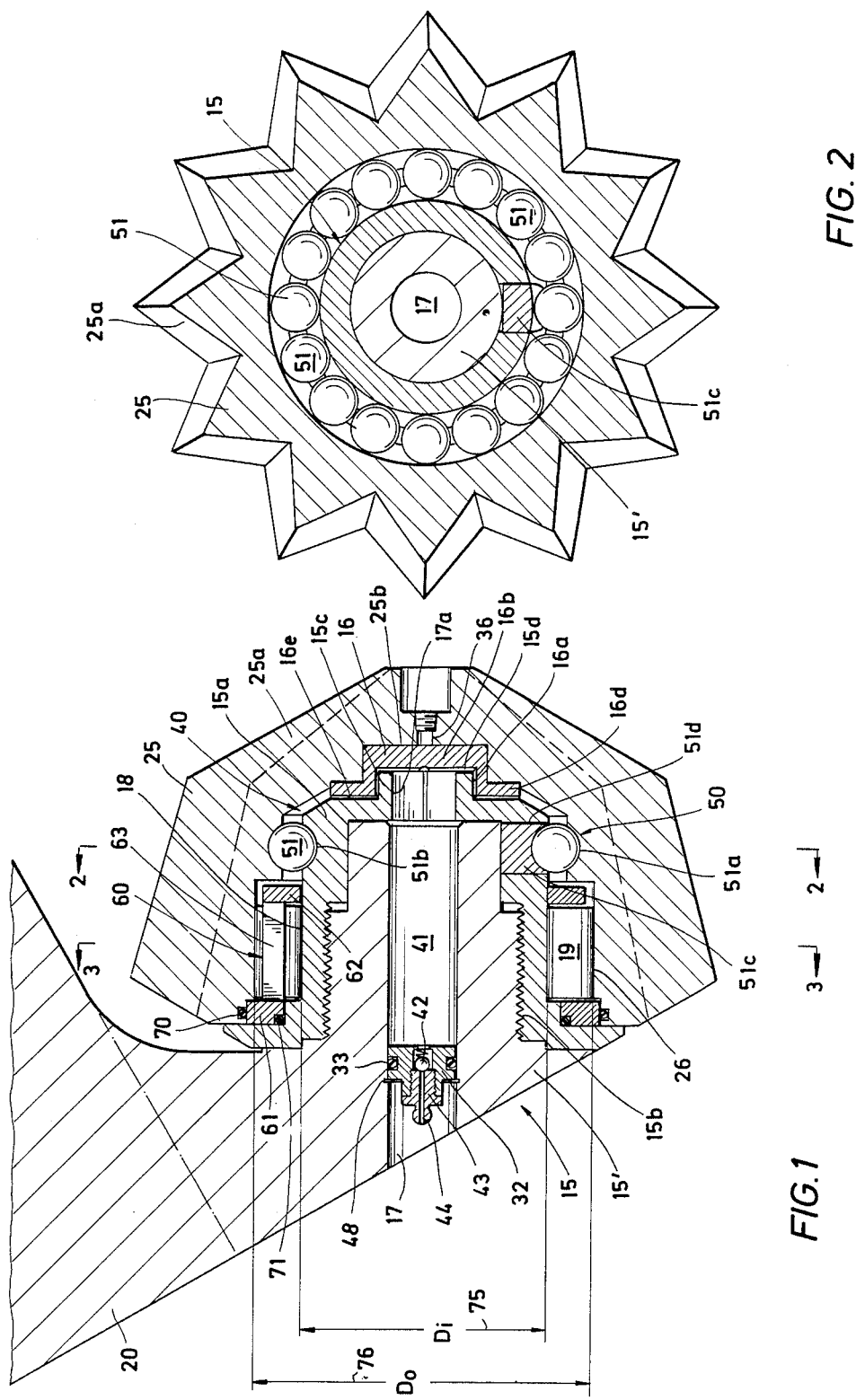

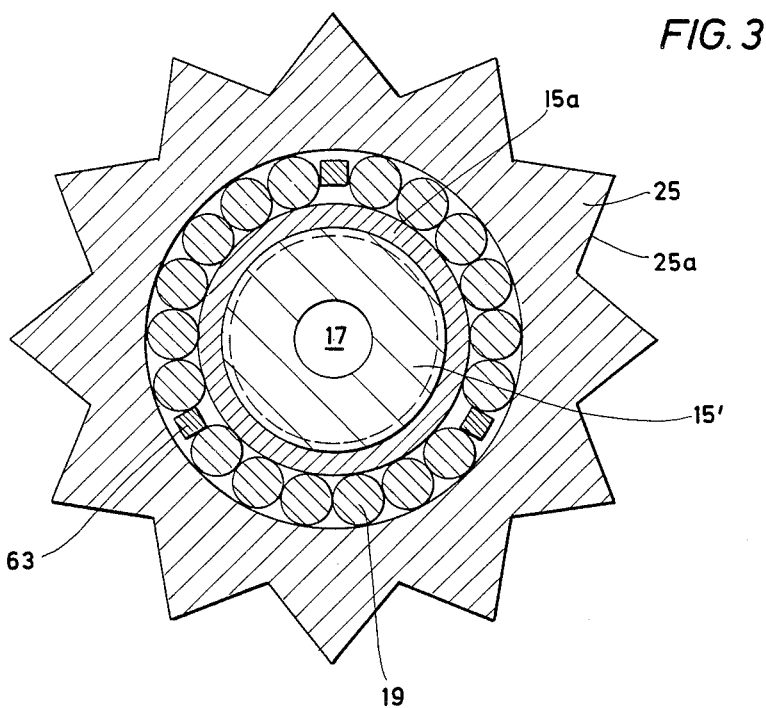
FIG. 3
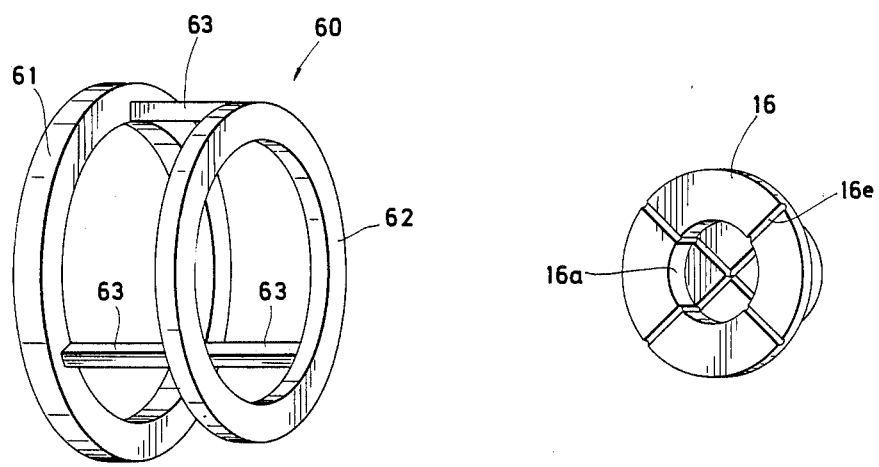
FIG. 4
FIG. 5

ARRANGEMENT FOR REDUCING SEAL DAMAGE BETWEEN ROTATABLE AND STATIONARY MEMBERS

STATEMENT OF THE PRIOR ART

Where a rotatable member rotates about a stationary member with seal means therebetween the seal means is subject to damage. As the speed of the rotational member is increased, the deterioration rate of the seal means also rapidly increases and either wears or is burned out so it must be replaced. In operations which are conducted so that replacement of the seal presents no great problem, the rotatable member can be removed from the stationary member and the seal replaced. However, where the environment or operation is such that access to disassemble the members cannot be readily accomplished without substantial expense and effort, the problem of replacing the seal is greatly increased.

The foregoing is quite prevalennt in earth boring operations where a cutter or cutter arrangement is mounted for rotation about a spindle on a shank and which cutter arrangement is employed in a borehole located at a remote location relative to the earth's surface. Not only is the borehole operation conducted in what may be a hostile environment, but it is desirable to conduct the borehole operations, whether it is enlarging the borehole, underreaming the borehole or drilling or coring the borehole, as quickly as possible. It is generally accepted that this may be accomplished by a combination of factors including the proper application of weight to the member on which the cutter arrangement is secured as well as the rate of rotation of the cutter on the member on which it is secured.

In an attempt to overcome some of the above problems various types of lubricant arrangements have been provided to attempt to reduce the heat transmitted to the seal during the relative rotation between the cutter and stationary member on which it is provided, and to in turn reduce the damage thereto. If the life of the cutter arrangement including the seals can be lengthened, the necessity of "tripping" the cutter arrangement (removing and replacing the cutter arrangement in the borehole) at frequent intervals is reduced, which can greatly decrease the cost of conducting various types of drilling and rotary operations in a well bore.

While seal arrangements have provided some solution, such seal arrangements may not enable a positive lubricant pressure to be maintained adjacent the seal and structural components of the cutter arrangement under all conditions to attain the desired affects. Also, some problems may be encountered in assuring that as lubricant is gradually lost by leakage around the seal means, additional lubricant is supplied to assure that lubricant is continuously present adjacent the field and the cutter components to reduce damage thereto.

Applicant is not aware of any arrangement for overcoming the above problems even though the concept of a plantary gear arrangement is quite old as indicated by Machinery's Handbook, 22nd Edition, published by Industrial Press, Inc., New York, New York at page 842-843. However, so far as known to applicant, employing additional structure with such concept to reduce substantially the effective rate of rotation of a rotatable member such as a cutter, or drill bit cone to seal means that seals between the rotatable and stationary member such as a spindle on which the rotatable member is mounted to inhibit damage to the seal means therebetween and thereby prolong the life of the seal means has never been employed. Also using such concept to form a lubricant chamber that receives a cage assembly and propelling means to effect a substantial decrease in the relative motion between the rotating member and seal means has apparently not been employed.

SUMMARY OF THE INVENTION

The present invention provides an arrangement for reducing the damage to a sealing relationship between a rotatable and stationary member wherein seal means are provided to form the sealing relationship between the rotatable and stationary member, the arrangement including means to substantially reduce the effective rotational speed of the rotatable member adjacent the sealing relationship between the rotational and stationary member, such means including first means to engage the seal means forming the sealing relationship and second means operable by rotation of the rotatable member to rotate said first means about the stationary member and adjacent the seal means at a substantially reduced rotational speed relative to the rotational speed of the rotatable member.

Yet a further object of the present invention is to provide an arrangement for reducing the damage to a sealing relationship between a rotatable and stationary member wherein seal means are provided so that the sealing relationship forms a lubricant chamber portion between the rotatable and stationary member.

Yet a further object of the present invention is to provide an arrangement for reducing the damage to a sealing relationship between a rotatable and stationary member wherein seal means are provided so that the sealing relatinship forms a first lubricant chamber portion between the rotatable and stationary member, said arrangement including means to substantially reduce the relative rotational speed adjacent the sealing relationship between the rotatable and stationary member which includes first means engaging the seal means forming the sealing relationship, second means operable by rotation of the rotatable member to rotate said first means about the stationary member at a substantially reduced rotational speed relative to the rotational speed of the rotatable member; and the first chamber portion receiving said first and second means and wherein the stationary member includes a lubricant chamber second portion, means for communicating the lubricant chamber first and second portions, piston means sealably engageable in the chamber second portion and movable therein in one direction in response to pressure externally of the chamber portions for equalizing pressure externally of the chamber portions with the pressure in the chamber portions, one-way valve means and piston means for conducting lubricant into the second chamber portion, said valve means operative to prevent reverse flow of lubricant therethrough and means to limit travel of said piston means in the other direction in the stationary member.

Yet a further object of the present invention is to provide a cutter arrangement which substantially reduces the relative rate of movement between the cutter means and surface means adjacent seal means which forms a lubricant chamber portion in the cutter arrangement to increase the life of the seal means and which chamber portion is constructed and arranged to enable lubricant in a second chamber portion in the cutter arrangement to be communicated to the first chamber portion to compensate for loss of lubricant during use of the cutter arrangement.

Yet a further object of the present invention is to overcome some difficulties encountered with seal arrangements and chamber lubricating arrangements used between relatively rotatable members.

Other objects and advantages of the present invention will become readily apparent from consideration of the following drawings and description.

BRIEF DESCRIPTION OF THE DRAWINGS

FIG. 1 is a one-half sectional view illustrating the present invention in conjunction with a rotatable member supported on a stationary member;

FIG. 2 is a sectional view on the line 2—2 of FIG. 1 to illustrate a form of the accommodating means for accommodating relative rotation between the rotatable member and the stationary member;

FIG. 3 is a sectional view on the line 3—3 of FIG. 1 illustrating structural details of the propelling or rotating means and rotatable surface or cage means associated therewith responsive to rotation of the rotatable member to rotate said rotatable surface or cage means at a substantially reduced rotational speed relative to the rotational speed of the rotatable member to inhibit damage to the seal means through which the rotatable surface means or cage means extends;

FIG. 4 is a perspective view of an embodiment of a rotatable surface or cage means;

FIG. 5 is a perspective view of a thrust bearing with lubricant communicating passages therein;

DESCRIPTION OF THE PREFERRED EMBODIMENTS

Figure 7:
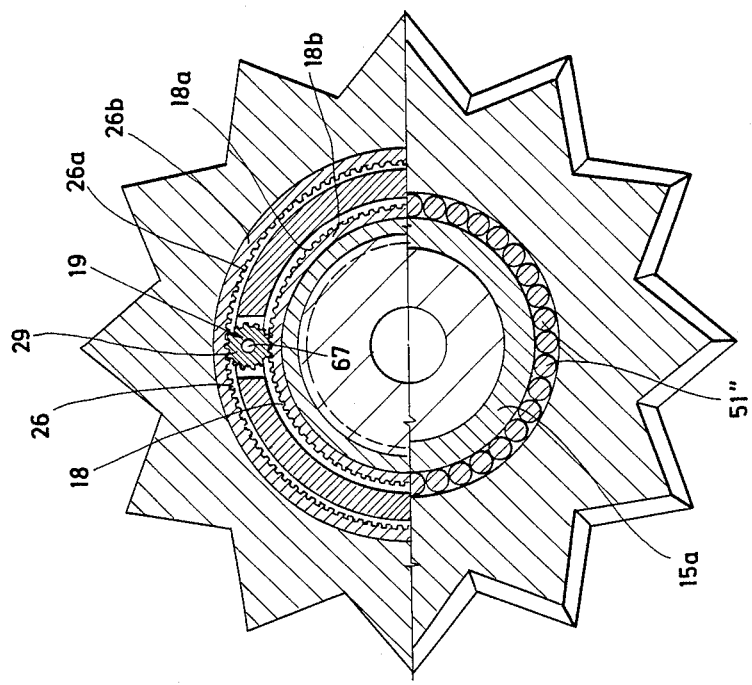
FIG. 7 is a sectional view on 7—7 of FIG. 6, the upper half of which is through the rotatable member, the ring gear means carried by the rotatable member and stationary member respectively, with the pinion gear therebetween which propels the rotatable surface means in response to the rotatable member; and the lower half of FIG. 7 is through the bottom one half of the rotatable member and a roller bearing between the rotatable and stationary members.

The present invention will be described in detail, and is illustrated in the drawings wherein it may be employed on a spindle referred to generally at 15 which projects from the bit shank 20 of a drill bit for drilling, coring, enlarging and underreaming operations in a well bore. However, it can be appreciated and it is to be understood that such explanation is by way of example only, and the present invention may be employed in any situation where it is desired to reduce damage to a sealing relationship between a rotatable and stationary member such as a bit cone or cutter 25 and while improving the lubricating arrangement employed in such configurations.

The cutter means or bit cone represented at 25 can assume any external cutting surface configuration or arrangement as may be desired to accomplish the cutting or drilling operations to be undertaken, whether it is in a borehole or otherwise. In FIG. 1 as well as the other figures of the drawings suitable cutter teeth are illustrated for purposes of illustration only at 25a.

The shank 20 may be of any suitable form and configuration and normally one shank and one nonrotatable member 15, which is commonly referred to as a spindle, is provided for each cutter or bit cone 25. A suitable number of cutters may be supported on a body to form a drill bit or other type of cutting arrangement, and in some instances a plurality of drill bits are employed to form a cutter arrangement.

The spindle 15 is illustrated in FIGS. 1-3, 6 and 9. The spindle 15 may be integral with the shank 20. It may be one piece as shown at 15' in FIG. 8 or it may include a sleeve member 15a as shown. Where the spindle 15 includes a sleeve 15a, in a preferred form it would still have the portion 15' that is either integral with the shank 20 or secured therewith by any suitable means such as welding or the like. The sleeve 15a may be removably secured with the spindle 15 and form a part thereof by any suitable means such as threads 15b. Where the sleeve 15a is employed, if a thrust bearing such as that represented at 16 is employed it may be positioned between the end 15d of the sleeve 15a and an adjacent abutting internal surface 25b on the bit or cone 25.

One form of the thrust bearing 16 which may be employed is shown in FIG. 5 and includes the counterbore 16a so that the end portion 16b telescopically receives the annular projecting portion 15c on the sleeve 15a as noted. The annular flange 16d extending radially from the counterbore 16a and the remainder of the surfaces adjacent the sleeve 15a are provided with suitable passage means such as the groove means 16e to form a means for communicating from the passage 17 of the spindle to the first chamber portion referred to generally at 40 between the bit 25 and spindle 15 as will be described. In some instances it may not be desirable to employ a thrust bearing and although not illustrated in FIGS. 6, 8 and 9 the passage means 16e would be employed where the thrust bearing is employed and abuts the end of the annular portion 15c so as to ensure communication between the interior of the spindle 15 and chamber 40 for communicating lubricant therebetween as will be described where the thrust bearing is not employed, the passages 16e would be formed in the integral portion of spindle 15.

Figure 8:
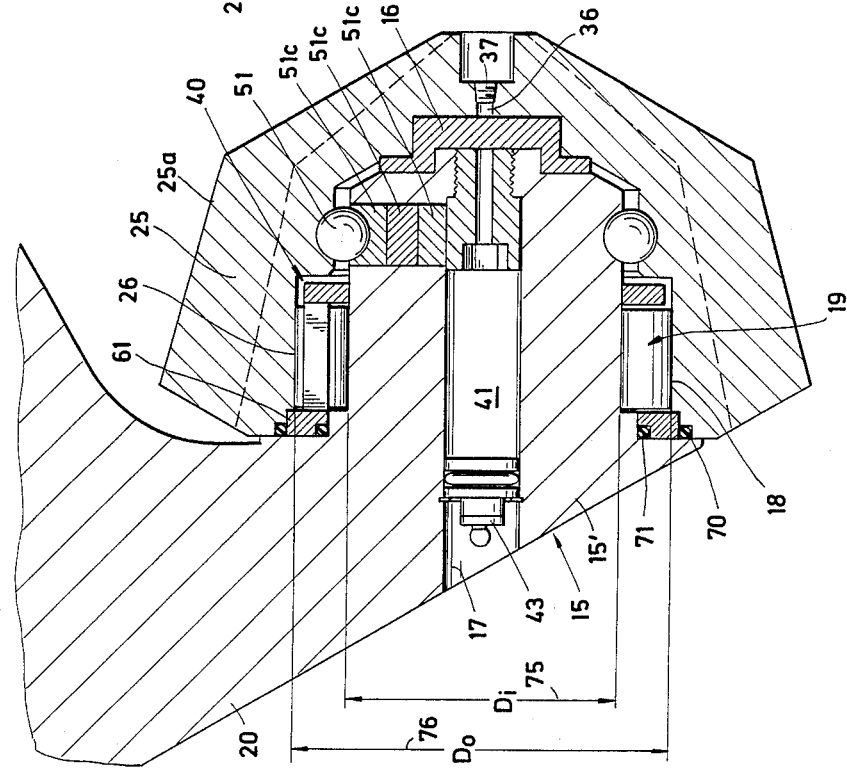
FIG. 8 is a view similar to FIG. 1 illustrates an alternate embodiment of the invention.

Accommodating means referred to generally by the numeral 50 are provided to accommodate rotation of the cutter 25 relative to the spindle 15 as well as carry radial and thrust loading that may be involved between the rotatable member 25 and stationary member 15. In FIGS. 1-3, 8 and 9 such accommodating means is shown as being in the form of ball bearings 51 which are received in suitable configured bearing races 51a formed in the cutter 25 and 51b formed in the sleeve 15a forming part of the spindle 15. A suitable plug 51c is provided for enabling the balls 51 to be inserted in the cutter arrangement as will be described.

Where the sleeve is omitted, a plurality of plugs 51c are employed as shown in FIG. 8 so as to enable them be of a size to be inserted through the passage 17 in the spindle 15 after the ball bearings have been positioned in the cutter 25 as will be described.

Figure 6:
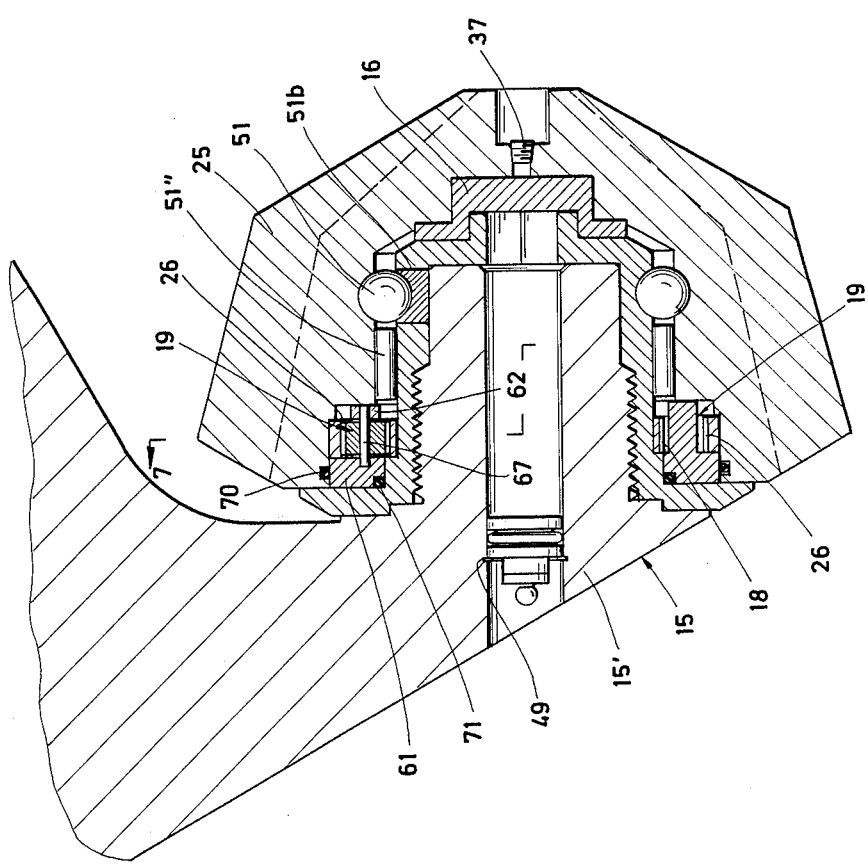
FIG. 6 is a view similar to FIG. 1 illustrating an alternate embodiment of propelling means for the rotatable surface means.
Figure 9:
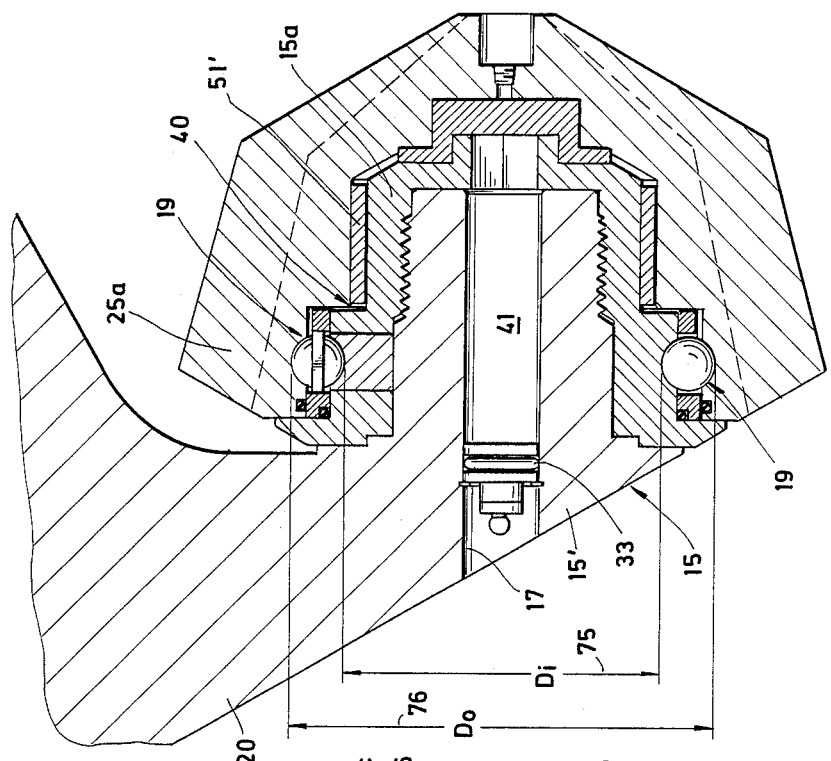
FIG. 9 is a one-half sectional view illustrating the invention where ball bearing means are employed as the means responsive to rotation of the cutter to rotate the associated rotatable surface means and wherein a journal bearing means is illustrated as the accommodating means.

The accommodating means 50 may assume any suitable arrangement such as the journal bearing 51' in FIG. 9 or roller and/or ball bearings depending upon the circumstances under which the cutter arrangement is to be employed. FIG. 6 illustrates the accommodating means as ball bearing 51 and roller bearings 51".

The stationary member or spindle 15 is provided with annular surface means 18 of suitable contour for providing a bearing race to receive rotatable or propelling means 19 which are responsive to rotation of the rotatable member or cutter 25 for propelling or driving the rotatable surface means or cage means referred to generally at 60. The rotatable means 19 may be in the form of roller bearings as shown in FIGS. 1 and 8 or in the form of ball means as shown in FIG. 9 or gear means 29 as shown in FIG. 6, all identified generally as 19. Also, tapered roller bearings may be also employed, in which event the annular surface 18 on the stationary member 15 will be suitably conformed.

An annular surface means 26 is also shown as being formed on the cutter 25 for receiving the rotatable or drive means 19, and again, the surface 26 will be suitably conformed to provide a bearing race to receive either roller bearings, ball bearings, tapered roller bearings, or formed to receive the gear arrangement shown in FIG. 6 all of which are rotatable by the cutter 25 to rotate the surface means or cage assembly 60. In FIGS. 6 and 7, the annular surface means 26 on the rotatable member 25 is formed by gear teeth 26a on the ring member 26b to provide a ring gear which may be secured with the cutter 25 in any suitable means such as by a press fit. Similarly, the annular surface 18 on the stationary member 15 is formed by gear teeth 18a on ring member 18b to form a ring gear that would be press fitted on the spindle 15 in any suitable means, or by other suitable means to be secured therewith. Any sutiable number of pinion gears 29 may be provided to form the rotatable means or propelling means referred to generally by 19.

The rotatable surface means or cage assembly 60 may be formed in any suitable manner so that it is engaged and propelled or driven by the drive means 19 in response to rotation of the cutter 25. It will be noted that seal means 70 shown on the cutter 25 and seal means 71 carried by the rotatable surface 61 of cage assembly means 60 cooperate to form a sealing relation between the rotatable member 25 and stationary member 15 and also provide the arrangement which enables the relative speed of the annular member or means 61 to rotate at a greatly reduced rate relative to the rotational speed of the cutter or rotatable member 25.

Any suitable means may be used to assure that the rotatable means 19 drive or propel the cage assembly 60 and in FIG. 1 it will be noted that the cage assembly 60 includes longitudinally spaced annular members 61 and 62 which are interconnected by at least one member 63. FIGS. 3 and 4 illustrate three longitudinal members 63 spaced circumferentially about 61, 62, extending between and connected with each of the members 61 and 62.

In FIGS. 6 and 7 the annular members 61 and 62 are connected by a shaft 67 which extends through the member 19 in the form of a pinion gear 29, such pinion gear being rotatable about the shaft 67. The shaft 67 is secured at each end with each of the members 61 and 62 so that when the cutter 25 rotates the pinion gear 29 rotates which in turn causes the pinion gear to walk around the ring members 26b and 18b thereby rotating the cage assembly 60 about the stationary member or spindle 15.

The exact form and configuration of the propelling means 19 and cage assembly 60 may vary and the relationship of the cage assembly 60 to the drive means 19 may vary from that described herein. However, the drive means must be related to the cage assembly 60 to rotate it about the spindle and a sealing reltionship between the cutter 25 and spindle 15 must be maintained, where lubricant is employed.

The relationship between the motion of the cutter 25 to the motion of the cage 60 for each revolution of the cone or cutter 25 is such that the rotational speed of the cage assembly 60 is substantially reduced in relation to the rotational speed of the cutter 25. This reduces the relative rotational speed between the cage assembly 60 and the seal 70 and also reduces the relative rotational speed between the seal 71 and the spindle 15 as compared with what it would be if the seal means 71 on the cutter contacted directly the stationary member or spindle 15.

The ratio of this rotational relationship by reason of the foregoing arrangement of the cutter 25 to the cage 60 is expressed by the formula $$\frac{1}{1 + \frac{D_i}{D_o}}$$

where $D_i$ is represented by the diameter of the spindle 15 as indicated at the arrow 75 and $D_o$ is the diameter indicated by the arrow identified at 76. It will be noted that $D_i$ is the diameter of the annular support surface 18 on the spindle 15 which receives the rotatable means 19 that is propelled by the cutter 25 and the $D_o$ diameter represented at 76 is the diameter of the annular support surface 26 formed on the cutter which drivingly engages the propelling means 19. When this relationship is maintained, for each revolution of the cutter 25, the cage assembly 60 will rotate approximately 0.55 to 0.65 revolutions. Thus, the relative rotation adjacent the sealing relationship formed by the cutter 25, rotatable surface means 61, spindle 15 and seal means 70, 71 is substantially reduced which in turn decreases the tendency to damage the seals 70, 71 by friction and also reduces the heat transmitted to the seals by friction.

Where the rotatable means 19 is in the form of a gear as shown in FIGS. 6 and 7, $D_i$ in the foregoing formula is the number of gear teeth on the inner ring member 18a, and $D_o$ is the number of gear teeth on the outer ring member 26a.

The seal means 70 and 71 cooperate with the rotatable surface means 60, cutter 25 and spindle 15 to form the lubricant chamber first portion 40 in which is received the accommodating means 51, the cage assembly 60 and the the drive means 19.

The spindle 15 is provided with the longitudinal passage 17 which communicates through the groove means 16e with the first chamber portion 40. Piston means 32 are provided with seal means 33 for sealably engaging in the passage bore 17 to define a second lubricant chamber portion 41 between the piston means 32 and the end 15d of the spindle 15 which communicates with the first lubricant chamber portion 40 by the groove 16e as previously mentioned. The piston means 32 includes a suitable valve means 42 which is one-way acting and a fitting 43 with a passage 44 therethrough that communicates with the valve means 42 for injecting or conducting lubricant into the second chamber portion 41. The piston 32 abuts a snap ring 48 positioned in a groove 49 in a passage 17 as shown. Thus, lubricant may be injected into the second chamber portion 41 through the fitting 43 and the piston 43 is unrestricted in its travel in one direction in passage 17 in response to pressure externally of the first and second chamber portions 40 and 41 to compensate for external pressure acting thereon and to equalize the external pressure with the pressure within the lubricating chamber portions 40 and 41. Also, should grease leak from chamber portion 40 between the seals 70 and 71, such unrestricted movement of the piston enables lubricant to be supplied from the second chamber portion 41 to the first chamber 40 so that proper lubricant supply is always present adjacent the seals 70 and 71. The one-way acting valve means 42 prevents flow of lubricant from the chamber 41 in the reverse direction.

The foregoing arrangement provides a means to substantially reduce the relative rotational speed adjacent a sealing relationship between a rotatable member and a stationary member on which it is supported wherein the cage assembly 60 and the propelling rotatable means 19 comprise respectively a first means that engage the seals forming the sealing relationship and a second means operable by rotation of the rotatable member to rotate the first means about the stationary member 15 at a substantially reduced rotational speed relative to the rotational speed of the rotatable member 25.

In assembly of the cutter arrangement any suitable sequence may be employed by those skilled in the art to accomplish the desired assembly. For example, the thrust bearing 16 would be dropped or placed in position in the cutter 25. Thereafter the seal means 70 would be inserted in the groove 70, when the seal groove is positioned inwardly from the rear end of the cutter as shown in FIG. 1. Then the rotatable surface or cage assembly 60 is inserted in the cutter 25 and the roller bearings 19 constituting the propelling means for the cage assembly 60 are placed in position and seal 71 is placed on the cage assembly 60 and the sleeve means 15a may then be placed in position in the cutter.

Thereafter, the balls 51 may be inserted through the opening 51d in sleeve 15a to be received in the bearing race formed by the contoured surface in the cutter and after the balls 51 are placed therein the plug 51c may be inserted in the opening 51d and is contoured to complete the bearing race or sleeve 15a. The plug 51c is inserted longitudinally through the sleeve 15a and then dropped in place through opening 15d as shown. If necessary the bit cone 25 can be rotated slightly to facilitate positioning of the plug 51c in place.

Thereafter, the sleeve 15a may be threaded on the remainder of the spindle 15 by inserting a wrench through the passageway 17 to engage in the noncircular opening 17a adjacent the thrust bearing 16 so that the sleeve 15a may be rotated as desired.

Thereafter, the piston means 32 with the seal 33 thereon is positioned in passage 17 towards the bottom adjacent the end of the sleeve 15a. Thereafter, grease or suitable lubricant may be conducted through the fitting 43 into the second chamber portion 41 and then through the groove 16e to the first chamber portion 40. As the chamber portions 40, 41 are filled with the lubricant the piston means 32 gradually moves outwardly of the passage 17 until it abuts against the snap ring 48 that has been positioned in groove 49 in passage 17. Grease will continued to be injected or conducted into the chamber portions until grease starts coming out the pipe plug opening 36 adjacent the end of the cutter 25. When grease comes around the thrust bearing 16 and out the pipe plug opening 36, this will indicate that the first and second grease receiving chamber portions 40, 41 are full and the pipe plug 37 may be threadedly engaged in the plug opening 36 in the cutter as shown to close it off. An additional amount of lubricant is then preferably inserted in chamber portion 41 to assure a positive lubricant pressure in chamber portions 40, 41. This assures that any leakage will occur from the interior to the exterior of the lubricating chamber portions. Where the lubricating chamber is merely equalized with the external pressure, it may be possible for leakage to occur from the exterior to the interior around the seals, thus contaminating the lubricant chamber. The arrangement described herein enables a positive pressure to be maintained in the lubricant chambers so that the pressure of the lubricant will be greater than ambient external pressure.

As previously noted a thrust bearing 16 may or may not be used. Where it is employed, it is replaceable and enables it to be more readily replaced than merely employing an integral part of the spindle as the thrust bearing portion which might have to be built up if it wore down.

As a practical matter, equalization occurs in the first and second chamber portions 40, 41 by reason of the fact that a small amount of air is trapped in the grease chamber. The piston arrangement in the passage 17 allows a greater or positive pressure in the grease chamber which may be greater than hydrostatic pressure, but initially it is only necessary to pressure up slightly greater than atmospheric pressure at the time of assembly which provides a positive pressure within the chamber portions 40, 41 and exterior pressure is compensated for by the fact that the piston 48 is free to move unrestrictedly relative to the passage 17 in response to pressure externally of the chamber portions 40, 41. Since an initial positive pressure is present in the chamber portions, and since the piston 48 is continually urged inwardly of passages 17 in response to external pressure, any leakage of lubricant around seals 70, 71 will be replaced by additional lubricant supplied from second chamber portion 41.

It will be noted that the cage assembly 60 includes at least one annular member which is supported between or extends between the seals to radially space and support seals 70 and 71 adjacent surfaces on the cutter and spindle 15 to maintain the sealing relationship therewith. While preferably two members 61 and 62 are illustrated, in some circumstances it may be that only one annular member is necessary to accomplish the desired result.

It will be noted that the seals 70, 71 may be positioned in grooves in each the cutter and annular member, or in end recesses of each the cutter and annular member as shown in the drawings. The seals may be of any suitable type as lip type or chevron. Other seal relationships with respect to the components may be employed which accomplished the beneficial results of the present invention.

Also, under present seal technology, it is preferred that the seal move with the member having the largest outer diameter of the seal so that the seal tends to remain stationary and rotates about its smallest internal diameter. It may be that other suitable seal arrangements to accomplish the advantages of the present invention may be employed as seal technology advances.

The foregoing disclosure and description of the invention are illustrative and explanatory thereof, and various changes in size, shape and materials as well as in the details of the illustrated construction may be made without departing from the spirit of the invention.

What is claimed is:

1. In an arrangement for rotatably supporting a cutter on a spindle of a cutter shank, the improvement comprising:
   rotatable means rotatable between the cutter and spindle;
   first seal means sealably engaging between said rotatable means and the cutter;
   second seal means spaced radially relative to said first seal means, said second seal means sealably engaging between said rotatable means and the spindle; and
   propelling means responsive to rotation of the cutter to rotate said rotatable means at a substantially reduced rotational speed relative to the rotational speed of the cutter to inhibit damage to said seal means.

2. The arrangement of claim 1 including bearing means to rotatably support the cutter arrangement on the spindle of the cutter shank.

3. The arrangement of claim 2 wherein said bearing means include ball bearing means.

4. The arrangement of claim 2 wherein said bearing means include journal bearing means.

5. The arrangement of claim 2 wherein said bearing means include roller bearing means.

6. The arrangement of claim 1 wherein said rotatable means includes a cage assembly rotatable upon rotation of the cutter.

7. The arrangement of claim 6 wherein said cage assembly includes at least one annular member and at least one longitudinal member extending from said annular member that is engageable by said propelling means upon rotation of the cutter.

8. The arrangement of claim 6 wherein said cage assembly includes longitudinally spaced annular members with at least one longitudinal member connected therebetween and wherein said means comprises ball bearing means.

9. The arrangement of claim 6 wherein said cage assembly includes longitudinally spaced annular members with at least one longitudinal member connected therebetween and wherein said means comprises roller bearing means.

10. The arrangement of claim 6 wherein said cage assembly includes longitudinally spaced annular members with at least one longitudinal member connected therebetween and wherein said means comprises gear means.

11. The arrangement of claim 10 wherein said gear means includes ring gear means supported by each the cutter and spindle and a pinion gear rotatably engaged with the ring gear means on the cutter and spindle.

12. The arrangement of claim 6 including removable sleeve means secured on the spindle, thrust bearing means supported adjacent said sleeve means between the cutter and said sleeve means and wherein said rotatable surface means, bearing means and rotatable means are supported on said sleeve means with said seal means engaging between said rotatable surface means and said sleeve means.

13. The arrangement of claim 6 wherein said cage assembly includes at least one annular member and at least one longitudinal memeber extending from said annular member engageable by said rotatable means upon rotation of the cutter and wherein said means responsive to rotation of the cutter comprises ball bearing means.

14. The arrangement of claim 6 wherein said cage assembly includes at least one annular member and at least one longitudinal memeber extending from said annular member engageable by said rotatable means upon rotation of the cutter and wherein said means responsive to rotation of the cutter comprises roller bearing means.

15. The arrangement of claims 1 or 2 wherein said seal means cooperates with said rotatable means, cutter and spindle to form a lubricant chamber first portion which receives said rotatable means and means responsive to rotation of the cutter and wherein the spindle includes a lubricant chamber second portion, means for communicating the lubricant chamber first and second portions, piston means sealably engageable in the chamber second portion and movable unrestrictedly therein in one direction in response to pressure externally of the chamber portions for equalizing pressure externally of the chamber portions with the pressure in the chamber portions, one-way valve means in said piston means for conducting lubricant into the second chamber portion, said valve means operative to prevent reverse flow of lubricant therethrough and means to limit travel of said piston means in the other direction in the spindle.

16. The cutter arrangement of claim 1 including an annular surface on each the cutter and the spindle and wherein the relationship of the motion of the cutter to said rotatable means for each revolution of the cutter is expressed by the ratio of $$\frac{1}{1 + \frac{D_i}{D_o}}$$

where $D_i$ is the diameter of said annular surface on the spindle that supports said propelling means and $D_o$ is the diameter of said annular surface on the cutter that supports said propelling means.

17. In an arrangement for rotatably supporting a cutter on the spindle of a cutter shank, the improvement comprising:
   a pair of seals which are radially spaced from each other;
   rotatable means extending between said pair of radially spaced seals to position one of said pair of radially spaced seals to sealingly engage between said rotatable means and the cutter and to position the other of said pair of radially spaced seals to sealingly engage between said rotatable means and the spindle; and
   propelling means responsive to rotation of the cutter to rotate said rotatable means at a substantially reduced rotational speed relative to the rotational speed of the cutter to inhibit damage to said pair of radially spaced seals.

18. The arrangement of claim 17 including bearing means to rotatably support the cutter arrangement on the spindle of the cutter shank.

19. The arrangement of claim 18 wherein said bearing means include ball bearing means.

20. The arrangement of claim 18 wherein said bearing means include journal bearing means.

21. The arrangement of claim 18 wherein said bearing means include roller bearing means.

22. The arrangement of claim 18 wherein said rotatable includes a cage assembly rotatable by said propelling means upon rotation of the cutter.

23. The arrangement of claim 22 wherein said cage assembly includes at least one annular member engageable by said means responsive to rotation of the cutter.

24. The arrangement of claim 22 wherein said cage assembly includes longitudinally spaced annular members with at least one longitudinal member connected therebetween and wherein said means responsive to rotation of the cutter comprises ball bearing means.

25. The arrangement of claim 22 wherein said cage assembly includes longitudinally spaced annular members with at least one longitudinal member connected therebetween and wherein said means responsive to rotation of the cutter comprises roller bearing means.

26. The arrangement of claim 22 wherein said cage assembly includes longitudinally spaced annular members with at least one longitudinal member connected therebetween and wherein said means responsive to rotation of the cutter comprises gear means.

27. The arrangement of claim 26 wherein said gear means includes ring gear means supported by each the cutter and spindle and a pinion gear rotatably engaged with the ring gear means on the cutter and spindle.

28. The arrangement of claim 22 including removable sleeve means secured on the spindle, thrust bearing means supported adjacent said sleeve means between the cutter and said sleeve means and wherein said rotatable means, bearing means and means responsive to rotation of the cutter are supported on said sleeve means with said seal means that seals between said rotatable means and the spindle engaging between said rotatable means and said sleeve means.

29. The arrangement of claim 22 wherein said cage assembly includes at least one annular member and at least one longitudinal member extending from said annular member engageable by said rotatable means upon rotation of the cutter and wherein said means responsive to rotation of the cutter comprises ball bearing means.

30. The arrangement of claim 22 wherein said cage assembly includes at least one annular member and at least one longitudinal member extending from said annular member engageable by said rotatable means upon rotation of the cutter and wherein said means responsive to rotation of the cutter comprises roller bearing means.

31. In an arrangement for reducing the damage to a sealing relationship between a rotatable and stationary member, the improvement comprising:
an inner annular surface on the rotatable member having an annular groove therein;
an outer annular surface on the stationary member;
a rotatable cage between said inner and outer annular surfaces, said cage having a groove therein adjacent said outer annular surface;
a seal for the groove in said inner annular surface for sealably engaging between the rotatable member and said cage;
a seal for the groove in said cage for sealably engaging between the stationary member and said cage; and
propelling means responsive to rotation of said rotatable means for rotating said cage at a reduced rotational speed relative to the rotational speed of said rotatable means to inhibit damage to said seals.

32. The arrangement of claim 31 wherein the sealing relationship between the rotatable and stationary members provide a lubricant chamber portion which receives said said cage and propelling means and wherein the stationary member includes a lubricant chamber second portion, means for communicating the lubricant chamber portions, piston means sealably engageable in the chamber second portion and movable unrestrictedly therein in one direction in response to pressure externally of the chamber portions for equalizing pressure externally of the chamber portions with the pressure in the chamber portions, one-way valve means in said piston means for conducting lubricant into the second chamber portion, said valve means operative to prevent reverse flow of lubricant therethrough and means to limit travel of said piston means in the other direction in the spindle.

33. In an arrangement for reducing the damage to a sealing relationship between a rotatable and stationary member wherein a pair of radially spaced seal means are provided to form the sealing relationship between the rotatable and stationary member, the improvement comprising:
means to substantially reduce the rotational speed adjacent the sealing relationship between the rotatable and stationary member, said means including:
first means extending between and sealingly engaging the radially spaced pair of seal means forming the sealing relationship; and
second means operable by rotation of the rotatable member to rotate said first means about the stationary member at a substantially reduced rotational speed relative to the rotational speed of the rotatable member to inhibit damage to the radially spaced seal means.

34. The arrangement of claim 33 including an annular surface on each the rotatable and stationary member for supporting said second means and wherein the relationship of the motion of the rotatable member to said first means for each revolution of the rotatable member is expressed by the ratio of $$\frac{1}{1 + \frac{D_i}{D_o}}$$

where $D_i$ is the diameter of said annular surface on the stationary member that supports said second means and $D_o$ is the diameter of said annular surface means on the rotatable member that supports said second means.

35. In an arrangement for reducing the damage to a sealing relationship that forms a lubricant chamber portion between a rotatable and stationary member wherein radially spaced first and second seals are provided to form the sealing relationship between the rotatable and stationary member, the improvement comprising:
means to substantially reduce the rotational speed adjacent the seals that form the sealing relationship between the rotatable and stationary member, said means including:

first means sealingly engaging and extending into the radial space between the first and second seals forming the sealing relationship;

second means operable by rotation of the rotatable member to rotate said first means about the stationary member at a substantially reduced rotational speed relative to the rotational speed of the rotatable member to inhibit damage to the radially spaced seals; and the chamber portion receiving said first and second means and wherein the stationary member includes a lubricant chamber portion, means for communicating the lubricant chamber portions, piston means sealably engageable in the stationary member chamber portion and movable therein in one direction in response to pressure externally of the chamber portions for equalizing pressure externally of the chamber portions with the pressure in the chamber portions, one-way valve means in said piston means for conducting lubricant into the stationary member chamber portion, said valve means operative to prevent reverse flow of lubricant therethrough and means to limit travel of said piston means in the other direction in the spindle.

36. An arrangement for reducing the damage to a sealing relationship between a rotatable and stationary member including:

first and second radially spaced seals for forming the sealing relationship between the rotatable and stationary members;

cage means between the rotatable and stationary members and extending into the radial space between said first and second seals for sealingly engaging said seal means; and means for reducing the relative rotational speed of said cage means in relation to the rotational speed of the rotatable member adjacent said first and second seals that form the sealing relationship to inhibit damage to the radially spaced seals.

* * * * *